(12) United States Patent
Wu

(10) Patent No.: US 6,388,985 B1
(45) Date of Patent: May 14, 2002

(54) DATA RECORDING METHOD FOR OPTICAL DISC

(75) Inventor: Guo-Zua Wu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/410,948

(22) Filed: Oct. 4, 1999

(51) Int. Cl.$^7$ .................................................. G11B 7/24
(52) U.S. Cl. .................................. 369/275.4; 369/275.3
(58) Field of Search ........................... 369/275.4, 275.2, 369/275.1, 13, 58, 44.16, 284, 286, 275.3, 100, 59.12, 13.55

(56) References Cited

U.S. PATENT DOCUMENTS

| | | | | | |
|---|---|---|---|---|---|
| 4,873,680 A | * | 10/1989 | Chung et al. | .................. | 369/59 |
| 4,896,313 A | * | 1/1990 | Hirose et al. | ............. | 369/275.4 |
| 5,003,527 A | * | 3/1991 | Matsumoto et al. | ......... | 369/100 |
| 5,570,339 A | * | 10/1996 | Nagano | .................... | 369/275.3 |
| 5,940,364 A | * | 8/1999 | Ogata et al. | ............. | 369/275.4 |

* cited by examiner

Primary Examiner—Ali Neyzari
(74) Attorney, Agent, or Firm—J.C. Patents

(57) ABSTRACT

An optical recording medium. Tracks are formed on a surface of an optical recording medium, and pits are formed in each track. Each pit is formed with at least two different widths.

4 Claims, 1 Drawing Sheet

DATA RECORDING METHOD FOR OPTICAL DISC

BACKGROUND OF THE INVENTION

1. Field of Invention

The present invention relates to an optical recording medium. More particularly, the present invention relates to an optical disk having pits with different widths.

2. Description of Related Art

Due to the small size and the large storage capacity of the optical recording media such as compact discs (CD) or digital video discs (DVD), optical recording media are widely used for storing music, movies and so on. In addition, optical recording media have lately begun to be used as a medium for storing a large amount of information.

In general, user data are digitally recorded on the optical recording medium. The user data is recorded in the following steps. The user data are encoded to channel bits by an encoding process. The channel bits are used to form pits in tracks on a surface of the optical recording medium. Moreover, each pit is formed with a fixed width in accordance with the width of the track. The channel bits are decoded to reveal the user data according to a read-out signal produced by an optical pick-up head.

Usually, 8 bits of user data are represented by a 14-bit channel bit after the encoding process. Referring to FIGS. 1 and 2, 8-bit user data 10 is transformed into a 14-bit channel bit 20 after the encoding process. Then, the channel bit 20 is used to form pits 22 in a track on the surface of the optical recording medium; the width of each pit 22 is fixed according to the width of the track. A read-out signal 24 is produced when an optical pick-up head scans the pits 22. An intensity of the read-out signal 24 is changed when the boundary of the pit 22 is scanned, and the intensity of the read-out signal 24 remains when the surface of the optical recording medium or the bottom surface of the pit 22 is scanned. By the change of the intensity of the read-out signal 24, the channel bits 20 are decoded.

The drawback of the method of recording user data described above is that the storage efficiency is less than 1 because a 14-bit channel bit only represents 8 bits of user data. Several methods have been proposed to increase the storage capacity of the optical disk. One of the methods is to provide a larger optical recording medium for increasing the surface area thereof. Another method is provided by reducing the width of the track to form smaller pits, and a new optical apparatus with a narrower wavelength light source should be used in this method. However, the optical recording medium formed by the above methods is not compatible with the conventional optical apparatus.

SUMMARY OF THE INVENTION

The invention provides an optical recording medium with increased storage capacity.

The invention provides an optical recording medium with large storage capacity, which is compatible with conventional optical apparatuses.

In accordance with an embodiment of the invention, tracks are formed on a surface of an optical recording medium, and pits are formed in each track. Each pit is formed with at least two different widths.

Another embodiment of the invention provides an optical recording medium with tracks formed on a surface of an optical recording medium and pits formed in each track. Some pits are formed with one width, and the other pits are formed with at least two different widths.

In the invention, the storage capacity of the optical recording medium is increased by forming the pits with different widths. By the invention, it is unnecessary to use a larger optical recording medium or form an optical recording medium not compatible with the conventional optical apparatuses.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

In the invention, pits with different widths are formed to increase the storage capacity of the optical recording medium.

Figure 1:
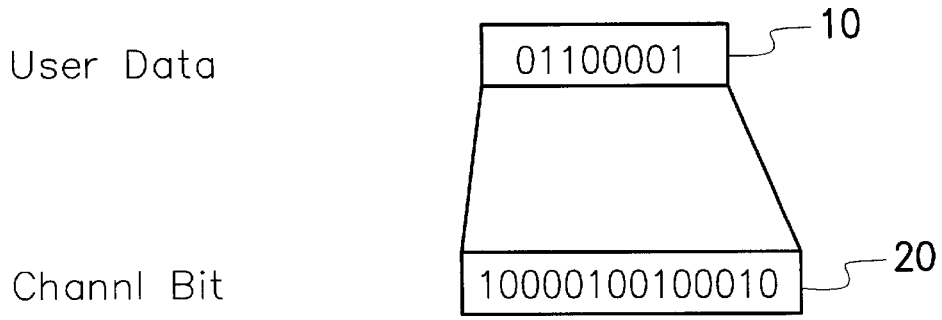
FIG. 1 is a conventional transfer relationship of user data and channel bits.
Figure 2:
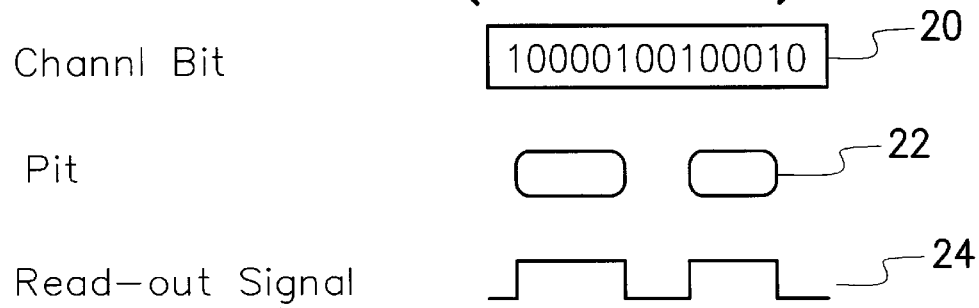
FIG. 2 is a map of the channel bits shown in FIG. 1, with pits formed according to the channel bits and read-out signals.
Figure 3:
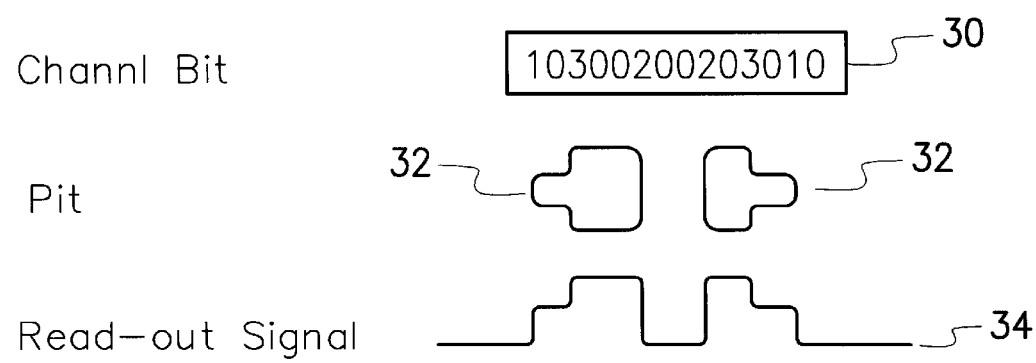
FIG. 3 is a map of the channel bits, with pits formed according to the channel bits and a read-out signal, according to an embodiment of the invention.

FIG. 3 is a map of the channel bits, with pits formed according to the channel bits and a read-out signal, according to an embodiment of the invention.

Referring to FIG. 3, pits 32 are formed according to a 14-bit channel bit 30. The pits 32 are both formed with two kinds of width. Moreover, each pit 32 has mirror symmetry about its length. In this embodiment, a second width of the pit 32 is about equal to the width of the track the conventional optical recording medium, and a first width of the pit 32 is narrower than the second one. Since each pit 32 is formed with two kinds of width, each channel bit should be redefined to represent the variation of the width. In this preferred embodiment, channel bit '0' represents a flat surface with no change in the width such as the surface of the optical recording medium or the bottom surface of the pit 32. Channel bit '1' represents a boundary of the first width of the pit. Channel bit '2' represents a boundary of the second width of the pit. Channel bit '3' represents a change from the first width of the pit change to the second width of the pit, and vice versa.

Because the width of the pit 32 is varied, an intensity of a read-out signal 34 is also affected by the variable width of the pit 32. As seen from the read-out signal 34 shown in FIG. 3, the read-out signal 34 has three different intensities to respectively indicate the variation of the width of the pit 32. Based on the different intensities of the read-out signal 34, each channel bit having multiple definitions is decoded.

By the different widths of the pit, more user data can be represented by the same number of the channel bits because one channel bit in the invention can represent more information. Based on the method of the invention described above, a 14-bit channel bit can represent about 128 to 1600 bits of user data. The storage capacity of the optical recording medium in the invention is increased without increasing the surface area of the optical recording medium. Furthermore, the optical recording medium is compatible with the conventional optical apparatuses because the maximum width of the pit is about equal to the conventional pit width.

Figure 4:
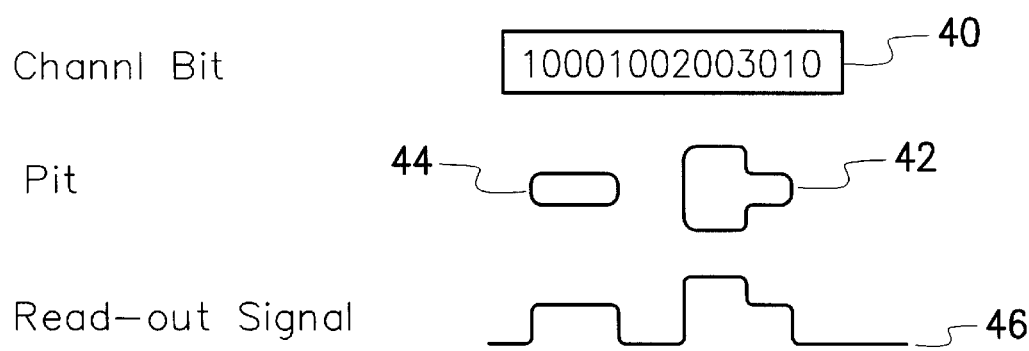
FIG. 4 is a map of the channel bits, with pits formed according to the channel bits and a read-out signal, according to another embodiment of the invention.

FIG. 4 is a map of channel bits, the pits formed according to the channel bits and the read-out signal, according to another embodiment of the invention.

Referring to FIG. 4, pits 42, 44 are formed according to channel bits 40. The pit 44 is formed with a single width, and the pit 42 is formed with two different widths. A second width of the pit 42 is about equal to the width of the track, which is about equal to the conventional width of the track, and a first width of the pit 42 is narrower than the second one. The width of the pit 44 is equal to the first width of the pit 42. The definition of the channel bit is the same as in the embodiment described above. A read-out signal 46 also has multiple intensities due to the different widths of the pit 42 and the pit 44.

The key point of the invention is to form a pit with different widths. The pit may be formed with one width or with different widths. By changing the width of the pit, one channel bit in the invention can represent more information. The storage capacity is increased without using a larger optical recording medium because the same number of channel bits can represent more user data. Additionally, the optical recording medium according the invention is compatible with the conventional optical apparatuses because the track width of the optical recording medium is about equal to the conventional track width.

These embodiments are used to describe the invention, but not to restrict the invention. The pit may be formed with more than two widths to increase the storage capacity even more, and the pit profile can also be changed so as to be suitable for other applications.

According to the foregoing, the advantages of the invention include the following:

1. The storage capacity of the optical recording medium is increased by forming the pit with different widths.

2. The optical recording medium in the invention is compatible with conventional optical apparatuses.

3. The design rule of the invention is suitable for various optical recording media such as compact discs, digital video discs, and compact disc-rewritable (CDRW) or magneto-optical (MO) discs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical recording medium comprising:

a plurality of tracks, wherein a plurality of pits are formed in each of the tracks and at least one of the pits has multiple constant width sections to form width transition boundaries inside the pits, wherein a different transition type represents a different stored data in the pits and a distribution of the widths is not regular.

2. An optical recording medium comprising:

a plurality of tracks further comprising:

a plurality of pits formed on the tracks, wherein some pits are formed with one width, and other pits are formed with at leas two widths, whereby a sequence of width transition boundaries are formed, in which each different type of the width transition boundaries represents a different recorded data.

3. An optical recording medium comprising:

a plurality of tracks; and a plurality of pits formed in each of the tracks wherein some of the pits have at least two widths and wherein a specific variation in width represents a channel bit recorded with a specific data and wherein each of the pits has mirror symmetry along the tracks.

4. The optical recording medium of claim 3, wherein:

a channel bit '0' represents a boundary of no change in width;

a channel bit '1' represents a boundary of a first width;

a channel bit '2' represents a boundary of a second width; and a channel bit '3' represents a change from the first width to the second width or a change from the second width to the first width.

* * * * *